3,371,076
PROCESS OF COPOLYMERIZATION OF ETHYLENE AND ALPHA-OLEFINES WITH FLUORINATED UNSATURATED MONOMERS

Mario Ragazzini and Donato Carcano, Milan, Italy, assignors, by mesne assignments, to Montecatini Edison S.p.A., Milan, Italy
No Drawing. Filed Mar. 9, 1962, Ser. No. 178,576
Claims priority, application Italy, Mar. 10, 1961, 4,527/61, Patent 648,753
1 Claim. (Cl. 260—87.5)

The present invention relates to a process of copolymerization of ethylene and more in general of alpha-olefines with unsaturated monomers containing at least one fluorine atom.

More in particular it relates to a process of copolymerization of the aforesaid monomers conducted in the presence of catalysts based on boron derivatives.

The importance that catalysts based on boron alkyl have been assuming these last years in the polymerization and copolymerization of vinyl monomers and vinylidene monomers is well known.

Moreover, there are also known processes of polymerization of ethylene and alpha-olefines wherein compounds of boron mixed with salts of metals selected from those of the 4th, 5th, 6th and 8th group of Mendeleeff's periodical table are employed as catalysts (e.g. U.S. Patent No. 2,840,551).

An earlier patent application in the name of the applicants, Serial No. 148,055, filed October 27, 1961, related to a process of polymerization and copolymerization of vinylic and vinylidenic monomers using as catalysts the complexes that boron alkyls, boron hydrides and alkyl boron hydrides form with substances having electron-donator character of the type of the derivatives of nitrogen, phosphorus, arsenic, antimony, bismuth, oxygen, sulfur, selenium. Preferably the electron donor substance is an ether. It has now been found surprisingly that boron alkyls, boron hydrides, alkyl boron hydrides and their complexes above described are particularly active in catalyzing the copolymerization of ethylene and alpha-olefines with fluorinated unsaturated monomers.

The resulting copolymers are white solids with high softening point, highly stable under chemical and physical attack, with good mechanical characteristics. On analysis the infrared spectrum of said products appears to be different from both that of the fluorinated homopolymer and that of the polyethylene or polyalpha-olefine, and characteristic of a copolymer formed by linear chains, wherein the units containing fluorine follow the non-fluorinated units.

In general the regularity of structure increases with the lowering of the copolymerization temperature as the molecular weight and the softening point of the copolymer are increasing, whence to lower temperatures there correspond better characteristics of the co-polymer.

It has also been found that the process of copolymerization according to the invention proceeds with higher speed and with better yields when the catalyst is activated with oxygen or, at any rate, with oxygen-containing substances capable of liberating under suitable conditions oxygen such as for instance the peroxides.

In this case it is particularly advantageous to use, as a catalyst, complexes formed by boron alkyls with substances having electron-donator character as described in the above-mentioned earlier patent application: said complex in fact is much more stable than boron alkyl alone and can more easily be activated with oxygen.

The products of reaction of oxygen with boron alkyls are not accurately known, though it is thought that the increased catalytic activity that is a consequence can be attributed to particular types of peroxides or to a redox type catalytic system. In general there exists an optimum ratio between oxygen and boron alkyl which for instance in the polymerization of vinyl chloride (Nakayama, Tsuruta, Furukawa-Makr. Chem. 40, 79 (1969)) is:

$$\frac{\text{moles oxygen}}{\text{moles B}(C_2H_5)_3} = 0.285$$

The particular and characteristic activity of the catalysts constituted by boron alkyls, boron hydrides, alkyl boron hydrides and their above described complexes in copolymerization, according to the invention, of fluorinated unsaturated monomers with ethylene or alpha-olefines in general is proved by the fact that while the tests of polymerization of fluorinated monomers alone, such as monochlorotrifluoroethylene, at room temperature, using as catalysts the boron alkyls, in solvents such as heptane or halogenated saturated hydrocarbons, give no result and those effected in a reaction medium such as acetone, water, ether, or more in general substances having electron-donator character, activating the catalysts with oxygen, yield only traces of polymer, if instead there are carried out tests of copolymerization between a fluorinated monomer and ethylene or an alpha-olefine, while the catalyst again is activated by oxygen, there occurs a considerable increase of the reaction velocity and of conversion and there is obtained a copolymer wherein the molar ratio between the two monomers is generally:

Moles of ethylene/moles of monochlorotrifluoroethylene $<2$

The ratio between the two monomers influences not only the reaction velocity and the conversion into a polymer, but also the characteristics of said polymer, such as for instance the softening point.

In the process of copolymerization according to the invention there are thus two parameters of chemical kind to be taken into consideration:

(1) Ratio between moles of catalyst and moles of oxygen (acting as an activator of the catalyst);
(2) Ratio between moles of fluorinated monomer and moles of ethylene or olefines.

In addition to these two parameters there are to be considered two other magnitudes which as is known influence the characteristics of polymerization:

(a) The temperature of polymerization;
(b) The reaction medium (quantity and kind).

It is also known that a change of temperature generates a variation in the velocity of decomposition of the initiator with free radicals with consequent variation of the velocity of polymerization.

By the process of polymerization according to the invention it is possible, moreover, as distinguished from the methods known so far which employ peroxydic catalysts, to operate at very low temperatures, down to $-150°$ C. and preferably down to $-100°$ C. and then to obtain a copolymer having improved characteristics, namely higher molecular weight and softening point and lower fragility.

The first tests were conducted by us at a temperature between $+20°$ C. and $+40°$ C. operating in an autoclave under an ethylene pressure variable up to a maximum of 40 atmospheres.

The copolymer that is obtained after for instance one hour of polymerization, with yields of 60 to 80% with respect to the starting monochlorotrifluoroethylene, has a molecular weight difficult to be determined by common chemical-physical methods, owing to its insolubility. The softening end point is generally below 150° C., which makes a low molecular weight to be expected.

If conducting the polymerization at $-80°$ C. in Dry Ice and triethanolamine, the velocity of polymerization appears to be diminished, the molecular weight of the polymer increases with consequent increase of the softening point and diminution of the fragility.

The copolymerization tests were conducted in this latter case in the mass, using monochloroethylene as a reaction means, only in some cases there were used saturated hydrocarbons as diluents for the monomer. For the tests conducted at room temperature there were generally employed solvents having polar character.

*Example 1*

Into a shaking autoclave of 1 liter capacity there are charged under nitrogen atmosphere in orderly succession 2 ml. of boron trimethyl previously activated by bubbling of oxygen, 5 ml. of ether, 250 ml. of heptane, 40 g. of monochlorotrifluoroethylene and 40 atmospheres of ethylene.

The temperature is kept at 25° C. and the autoclave is put under agitation for 5 hours. After that period, 30 g. of copolymer are discharged from the autoclave with a percentage of chlorine of 24% corresponding to a molar ratio:

$$\frac{\text{ethylene}}{\text{monochlorotrifluoroethylene}} = 1$$

*Example 2*

The test is conducted as in Example 1, replacing boron triethyl by boron hydride. After equal duration of reaction, 15 g. of polymer are obtained.

We claim:
1. In a process for the copolymerization of ethylene and chlorotrifluoroethylene by contacting said monomers, at a maximum pressure of 40 atm. and a temperature from −100° to +50° C. and in an inert atmosphere in the presence of a catalyst selected from the group consisting of complexes of boron trialkyls, boron hydrides, and boron alkyl hydrides with substances having electron donator character, the molar ratio between the ethylene and chlorotrifluoroethylene being between 1 and 2, wherein the catalyst is activated by a substance yielding oxygen and selected from the group consisting of oxygen itself, peroxides and oxygenated substances capable of evolving oxygen, the improvement which consists in using as the electron donator substance a compound selected from the group consisting of ethers.

References Cited
UNITED STATES PATENTS

| | | | |
|---|---|---|---|
| 2,392,378 | 1/1946 | Hanford | 260—87.5 |
| 2,840,551 | 6/1958 | Field. | |
| 2,842,474 | 7/1958 | Pratt. | |
| 2,963,459 | 12/1960 | Nicholson et al. | 260—87.5 |
| 2,985,633 | 5/1961 | Welch | 260—87.5 |
| 3,025,284 | 3/1962 | George et al. | |
| 3,041,324 | 6/1962 | De Coene et al. | 260—89.1 |
| 3,051,689 | 8/1962 | Zutty | 260—87.5 |
| 3,112,298 | 11/1963 | Welch | 260—92.1 |
| 3,275,611 | 9/1966 | Mottus, et al. | 260—80.5 |

JOSEPH L. SCHOFER, *Primary Examiner.*

WILLIAM H. SHORT, LOUISE P. QUAST, *Examiners.*

J. A. DONAHUE, J. F. McNALLY, *Assistant Examiners.*